United States Patent [19]

Duret et al.

[11] Patent Number: 5,419,289
[45] Date of Patent: May 30, 1995

[54] DEVICE FOR CONTROLLING THE PNEUMATIC INJECTION OF A CARBURETED MIXTURE IN A TWO-STROKE INTERNAL-COMBUSTION ENGINE AND ASSOCIATED UTILIZATION

[75] Inventors: Pierre Duret, Sartrouville; Stéphane Venturi, Choisy le Roi, both of France

[73] Assignee: Institut Francais du Petrole, Rueil Malmaison, France

[21] Appl. No.: 85,082

[22] Filed: Jul. 2, 1993

[30] Foreign Application Priority Data

Jul. 2, 1992 [FR] France .................... 92 08300

[51] Int. Cl.⁶ ............................................. F02B 33/04
[52] U.S. Cl. ......................... 123/73 B; 123/73 AB; 123/65 VB
[58] Field of Search ............ 123/73 R, 73 AB, 73 AC, 123/73 AF, 73 B, 73 S, 73 C, 73 CA, 73 AE, 65 B, 65 BA, 65 VB

[56] References Cited

U.S. PATENT DOCUMENTS

| | | | |
|---|---|---|---|
| Re. 27,367 | 5/1972 | Seggern et al. | 123/73 AB |
| 2,189,106 | 2/1940 | Garve et al. | 123/65 BA |
| 2,285,671 | 6/1942 | Mallory | 123/65 VB |
| 4,361,126 | 11/1982 | Knapp et al. | 123/585 |
| 4,364,347 | 12/1982 | Miyagi | 123/585 |
| 4,579,093 | 4/1986 | Eanes . | |
| 4,955,333 | 9/1990 | Klomp | 123/73 AC |
| 5,005,537 | 4/1991 | Maissant | 123/65 VB |

FOREIGN PATENT DOCUMENTS

| | | |
|---|---|---|
| 0279429 | 8/1988 | European Pat. Off. . |
| 4012471 | 10/1990 | European Pat. Off. . |
| 0406078 | 1/1991 | European Pat. Off. . |
| 0406083 | 1/1991 | European Pat. Off. . |
| 0458670 | 11/1991 | European Pat. Off. . |
| 2547353 | 12/1984 | France ............ 123/73 AC |
| 2662214 | 11/1991 | France . |

OTHER PUBLICATIONS

Patent Abstracts of Japan, vol. 11, No. 28 (M-557) (2475) Jan. 27, 1987.

*Primary Examiner*—Noah P. Kamen
*Attorney, Agent, or Firm*—Antonelli, Terry, Stout & Kraus

[57] ABSTRACT

A device for controlling a pneumatic injection of a carbureted mixture into a combustion chamber of a two stroke internal combustion engine, with the device including a compressed gas supply pipe adapted to be communicated with the combustion chamber of a cylinder by an intermittent sealing element, and a fuel metering device opening into the compressed gas supply pipe. A selective sealing element is arranged in the compressed gas supply pipe upstream from the intermittent sealing element and from the fuel injection device for controlling all carbureted mixture conveyed into the compressed gas supply pipe and used for pneumatic injection according to operating conditions of the internal combustion engine.

17 Claims, 4 Drawing Sheets

DEVICE FOR CONTROLLING THE PNEUMATIC INJECTION OF A CARBURETED MIXTURE IN A TWO-STROKE INTERNAL-COMBUSTION ENGINE AND ASSOCIATED UTILIZATION

BACKGROUND OF THE INVENTION

The present invention relates to the pneumatic injection of a carbureted mixture into a combustion chamber of a two-stroke internal-combustion engine.

More precisely, the device according to the invention allows control of the rate of flow and of the pressure of the air under pressure used for spraying pneumatically the fuel into the combustion chamber.

In the particular case of a pneumatic injection two-stroke engine such as disclosed, for example, in patent FR-2,575,523, the air under pressure used for spraying fuel pneumatically may come from the pump crankcase and only a small proportion of this air is used for pneumatic injection, with the major part of this air taking part in the scavenging of the cylinder.

Regulation and control of the pressure and of the flow rate of the air under pressure necessary for the pneumatic injection of fuel are two very important parameters which may contribute towards improving the combustion very substantially.

According to the invention, the combustion quality will be notably be improved with respect to the stratification conditions of the gases in the combustion chamber, at low speeds and low loads.

The present invention allows adaptation of the geometry of the pneumatic fuel injection jet, as well as of its distribution in space and in time, in order to optimize its penetration and its mixing with the gases already contained in the combustion chamber of the engine.

It is known that, in a two-stroke engine such as illustrated, for example, in FIG. 1, the pneumatic injection system may comprise a pipe opening into the combustion chamber, intended for conveying a gas generally under pressure used for spraying the fuel. The fuel may be fed into the pipe through a metering system which opens preferably close to the end of the pipe opening into the combustion chamber. An intermittent sealing element such as, for example, a valve, generally located at the place in which the pipe opens, allows, as soon as it is open, the fuel to be sprayed into the combustion chamber by compressed gas used. Patents FR-2,575,521 and FR-2,575,522 show injectors of this type.

The pressure source used in these examples may come, as illustrated by French patent FR-2,575,523, totally or partly from the pump crankcase of the cylinder in which injection takes place or of another cylinder whose angular offset is used to modify the injection pressure.

Various solutions have been proposed to improve such injection systems, notably in order to increase the pressure of the compressed gas. Thus, French patent FR-B1-2,592,436 recommends placing a check valve on the pipe delivering gas under pressure so that part of the pipe constitutes a capacity for storing gas under pressure.

Although these various designs allow the injection pressure to be raised, they are not modulatable as a function of the various operating conditions of the engine because they are mainly controlled through pressure differences. Thus, if the pneumatic injection system is adjusted so as to obtain an optimum spraying with high loads and high speeds, poorer performances might be achieved at lower speeds. In fact, for example when the opening of the controlled system is optimized to obtain the required spraying quality and penetration at high loads and high speeds, if the same pressure level of compressed air is maintained for lower is speeds, the introduction of the compressed air-fuel mixture may be too fast, driving, for example, the fuel towards the exhaust port too rapidly.

This example is illustrated in FIG. 2 which shows pressure curves as a function of the crankshaft angle. Curve C shows the evolution of the pressure in the cylinder and curves A and B show respectively the compressed air pressure (in the supply pipe) at high speed and at low speed.

The injection time I substantially stretches out around the exhaust valve closing FE.

In FIG. 2, OE relates to the exhaust valve opening, PMH and PMB respectively relate to the top dead center and to the bottom dead center.

FIG. 2 shows a case where the compressed air pressure decreases too quickly at low engine speeds (curve B), and quickly reaches the cylinder pressure (curve C), long before the closing of the valve which corresponds to the end of the injection. The result of this is a too sudden inflow of carbureted mixture, which may be harmful at high loads and low speed because a significant amount of fuel may then reach the exhaust and escape in the atmosphere without burning. This phenomenon may also be harmful at low loads because the carbureted mixture injected too rapidly and too suddenly mixes too quickly with the residual waste gases contained in the cylinder and is no longer flammable at the time of the ignition or of the expected starting of the combustion.

On the other hand, as also shown in FIG. 2, if the carbureted mixture is introduced too rapidly, with too fast a compressed air pressure drop, a phenomenon known as a backflow, where the gases flow back from the cylinder to the level of the pneumatic injector, may occur, and the cylinder pressure becomes higher than the compressed air pressure upstream from the pneumatic injector. This backflow, which takes place in the zone II in FIG. 2, is not favorable because it decreases the cylinder compression and may feed residual gases into the pneumatic injector, which is not desirable to obtain good conditions of flammability of the carbureted mixture during the next cycle.

SUMMARY OF THE INVENTION

The device according to the invention thus allows notably the problem related to too fast and/too sudden an introduction of the carbureted mixture into the combustion chamber to be avoided.

Moreover, it allows the re-introduction or backflow of the carbureted mixture from the cylinder to the level of the pneumatic injector to be minimized or even is avoided.

More precisely, the device according to the invention makes it possible to get closer to curve D shown in dotted line in FIG. 2 and which shows the evolution of the pressure at low speed. During the injection I, this pressure is never lower than the cylinder pressure, which means that no backflow occurs in this ideal case.

Constant and continuous spraying may thus be achieved.

The aim of the device according to the invention is to have a lower amount of air introduced at the beginning of the opening of the valve (or of the control means) and to spread this introduction over the total opening range of the valve. This allows a lower and more constant velocity of the air at the level of the valve to be obtained during the total opening time. The fuel is thus sprayed more slowly and less suddenly into the cylinder.

The penetration of the carbureted mixture into the cylinder is slowed down, which allows, under operating conditions of the engine where many residual waste gases are present in the cylinder (two-stroke engines under low load conditions for example), mixing between these residual waste gases and the injected carbureted mixture to be avoided at the maximum. A stratification between the carbureted mixture and the residual gases may thus be obtained, which is very favorable to combustion.

To reach these objectives, the device for controlling the injection comprises a pipe for supplying compressed gas, which may be communicated with the combustion chamber of a cylinder by means of an intermittent sealing element and a fuel metering device opening into said pipe.

According to the invention, the device further comprises a selective sealing element arranged in said pipe upstream from said intermittent sealing element and from said fuel injection device, intended for controlling the carbureted mixture conveyed in said pipe and used for the pneumatic injection, as a function of the running conditions of said engine.

The aim of the invention is therefore to introduce into the compressed gas supply pipe, upstream from the element communicating the pipe with the combustion chamber and upstream from the fuel metering device, a means for restricting the flow of compressed air so as to slow down its velocity, and possibly, in certain embodiments, to prevent this velocity from inverting (in order to avoid backflow).

The gas under pressure may be supplied from a pump crankcase or from a pressure source outside the cylinder considered.

According to an embodiment of the invention, the intermittent sealing element may be a valve.

Without departing from the scope of the invention, this element may be a rotary plug.

The selective sealing element may be a butterfly valve or a rotary plug.

According to a particular embodiment of the invention, the selective sealing element may include an assembly of at least one leaf dog associated with at least one spring, of the fiber glass type or other, on a support, with the assembly forming a non-return valve.

According to another embodiment of the invention, the selective sealing element may include of a part restricting the section of the pipe over a length which varies as a function of the operating conditions of the engine.

The device according to the invention may also comprise a line for bypassing the supply pipe, with the line, of a smaller diameter than the pipe, being located on either side of the selective sealing element and allowing the minimum amount of air necessary for the pneumatic injection to be conveyed under a high pressure.

The bypass line may be provided with an element for restricting flow rate thereof.

Preferably, the fuel injection device may open into the part of the bypass which is disposed at the shortest distance from the first sealing element.

According to another embodiment of the invention, at least one transfer channel for injecting scavenging air coming from the pump crankcase into the cylinder may be provided with an element for restricting a flow rate of the air so as to achieve a modulation between the flow rate of air injected for the scavenging through the transfer channel and the flow rate of air for the pneumatic injection of fuel.

BRIEF DESCRIPTION OF THE DRAWINGS

Other features and advantages of the present invention will become more apparent from a reading of the description given by way of non-limitative examples, with reference to the accompanying drawings, wherein.

DESCRIPTION OF THE PREFERRED EMBODIMENTS

Figure 3:
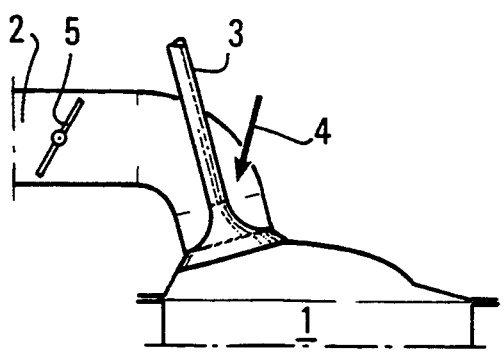
FIGS. 3 and 3a are schematic views of an embodiment of a device according to the invention.

FIG. 3 diagrammatically shows a combustion chamber 1 into which a compressed gas supply pipe 2 which may be communicated with the combustion chamber by an intermediate sealing element or valve 3 such as a valve opens. A rotary plug or any other conventional intermittent sealing means may be used. The motion of the sealing element 3 may be controlled in a conventional manner by conventional control elements.

A fuel metering device 4 allows liquid fuel to be introduced into the compressed gas supply pipe 2, preferably near the end of the compressed gas supply pipe 2 opening into the combustion chamber 1.

Figure 4:
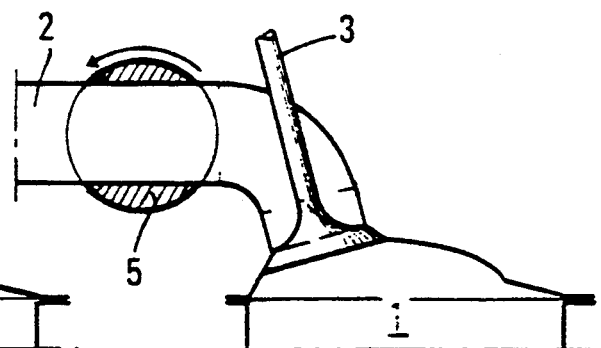
FIG. 4 is a partial cross-sectional schematic view of another embodiment of the device according to the invention.

According to the invention, a selective sealing element 5, for example, a butterfly valve, is arranged in the compressed gas supply pipe 2 upstream from the fuel metering device 4 and from the intermittent sealing element 3. According to FIG. 3, the selective sealing element 5 is a butterfly valve, whereas a rotary element such as a plug has been illustrated in FIG. 4. Other solutions such as diaphragms for filling the same function may of course be used without departing from the scope of the present invention.

Figure 2:
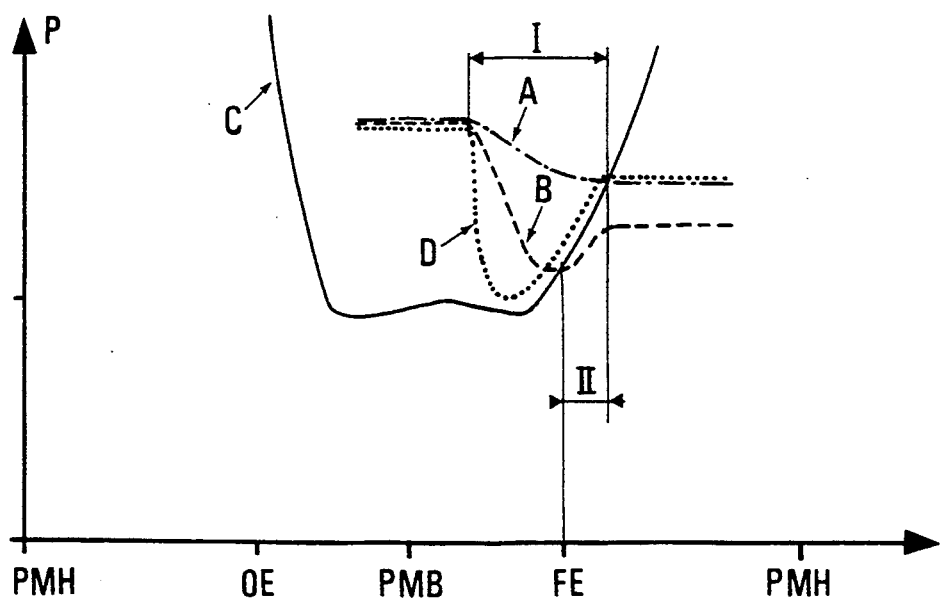
FIG. 2 is a graphical illustration depicting pressure curves as a function of the crankshaft angle of an engine.

The selective sealing element 5, controlled independently of the intermediate sealing element 3 by conventional means allows the opening section of the compressed gas supply pipe 2 to be more or less sealed as a function of the moment of the cycle, the load, the speed, or other parameters related to the operation of the engine. Thus, if the butterfly valve 5 largely seals the opening section of the compressed gas supply pipe 2, when the valve 3 opens, the gas supply pressure will decrease in the compressed gas supply pipe 2 downstream from the selective sealing element 5 and remain relatively high upstream from the selective sealing element 5. Upstream and downstream are defined here in relation to the main direction of the flow of gases, that is, towards the combustion chamber 1. The adjustment discussed above leads to a slow gas flow, prolonged in time, in order to avoid a possible backflow, such as shown, for example, by curve D in FIG. 2.

Figure 3A:
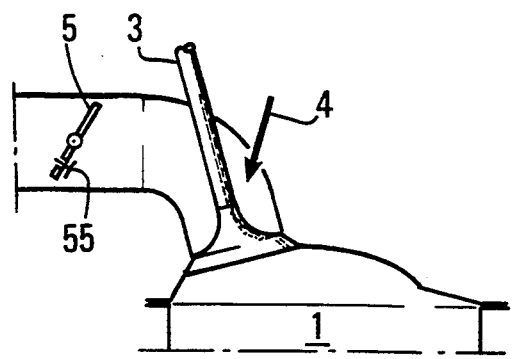

Additionally, as shown in FIG. 3A, another solution may include placing a check valve 55 on the selective sealing element 5. Thus, when the selective sealing element 5 is closed, the compressed air only passes through valve 55, whereas, when the selective sealing element opens, the valve no longer has any effect.

This association allows the check valve effect, when the selective sealing element 5 is closed, to be combined with a direct control of the flow rate by the selective sealing element.

Figure 5:
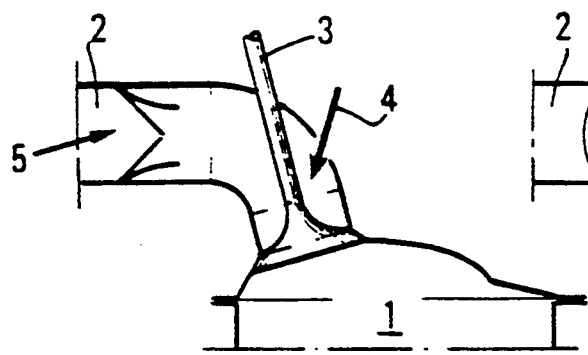
FIG. 5 is a schematic view of a third embodiment of the device of the present invention.

FIG. 5 shows another embodiment of the invention where the selective sealing element 5 includes of check valves. In the example shown, valves are used formed as leaf springs 51 (FIGS. 5A, 5B), with the leaf springs 51 being adapted to open as a function of the pressure variation upstream/downstream from the valves. They lead therefore to a pressure drop which, furthermore, varies as a function of this pressure variation. This solution also has the advantage of preventing a gas backflow from the combustion chamber upstream from the selective sealing element 5.

More precisely, the leaf springs 51 may be metallic or made from a composite material fashioned of glass fibers or carbon fibers.

Figure 5A:
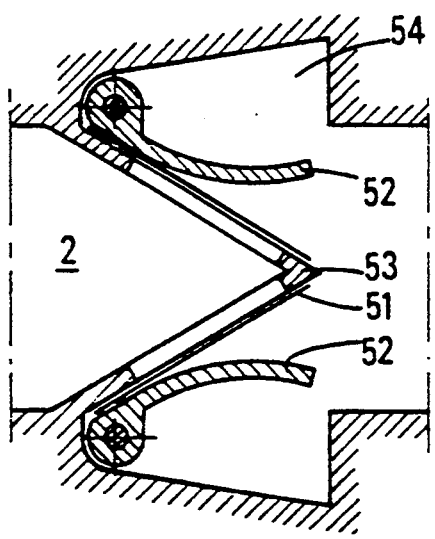
FIGS. 5A–5D are cross sectional detail views of the embodiment of a selective sealing element of the device of FIG. 5.
Figure 5B:
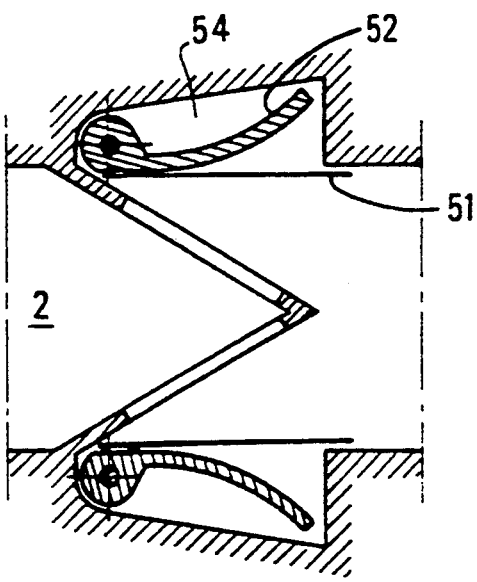

In the example of FIGS. 5A and 5B, the assembly consisting of leaf springs 51 and of associated dogs 52 is rotatably mounted about an axis perpendicular to the axis of the compressed gas supply pipe 2. This lay-out allows the check valve effect in the closed position to be combined with an effect of direct control of the flow rate as a function of the opening. Moreover, a supporting element 53 may constitute a dog in the center of the compressed gas supply pipe 2 so as to provide suitable tightness when the leaf springs 51 are in the maximum sealing position (FIG. 5A). Of course, when a large flow of air is to pass through compressed gas supply pipe 2, a linkage or any other means may rotate the leaf-dog assembly 51, 52 for example, into a recess 54 provided in the pipe, so as to offer a maximum opening section to the gas under pressure.

Figure 5C:
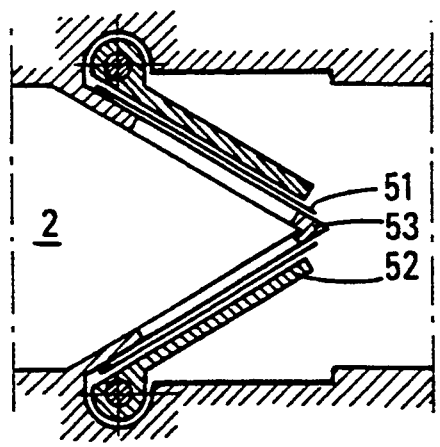
Figure 5D:
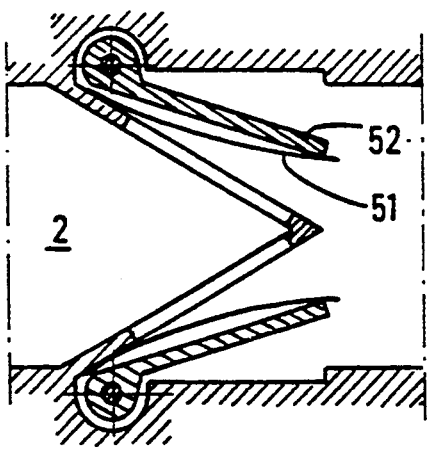

According to the embodiment of the invention in FIGS. 5C and 5D, only the dogs 52 are rotatably mounted. The opening is therefore still controlled by the leaf spring-dog assembly 51, 52, but its maximum amplitude is controlled only by the position of the dogs, one end of leaf springs 51 being fitted for example, in support 53 while the maximum displacement of the free end of the leaf springs 51 in the center of the compressed gas supply pipe 2 is limited by the position of dogs 52.

Figure 6A:
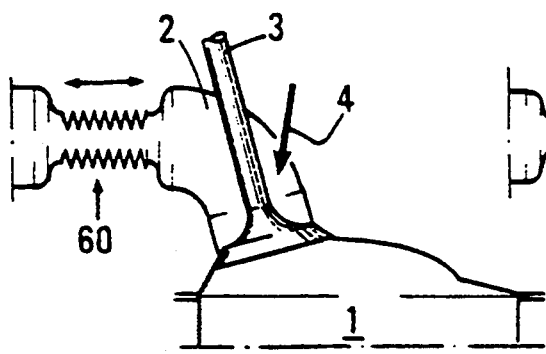
FIGS. 6A and 6B are schematic views of extreme positions of a selective sealing element according to the invention.
Figure 6B:
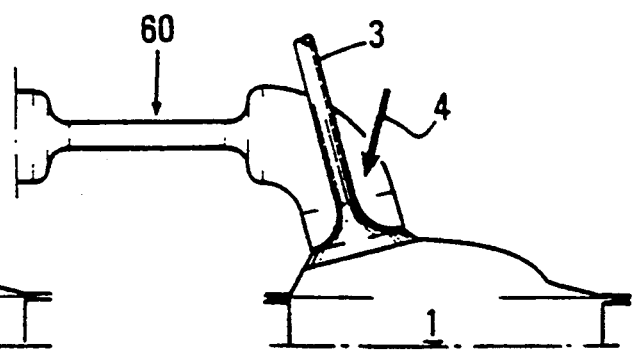

In the example illustrated in FIGS. 6A and 6B, the restriction and the pressure drop are obtained by a line 60 of limited section with respect to pipe 2. Besides, with the line 60 preferably has a variable length, this length variation allowing the pressure drop to be controlled and optimized for each running condition of the engine. FIG. 6A shows line 60 with a minimum length, hence a low pressure drop, and FIG. 6B shows line 60 in a maximum length position.

Line 60 may, for example, consist of bellows capable of stretching under the effect of a pressure variation.

Figure 7A:
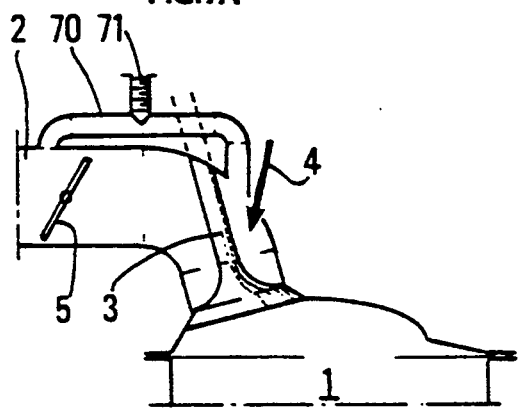
FIGS. 7A, 7B and 7C are schematic views of the invention comprising a bypass line around a selective sealing element.
Figure 7B:
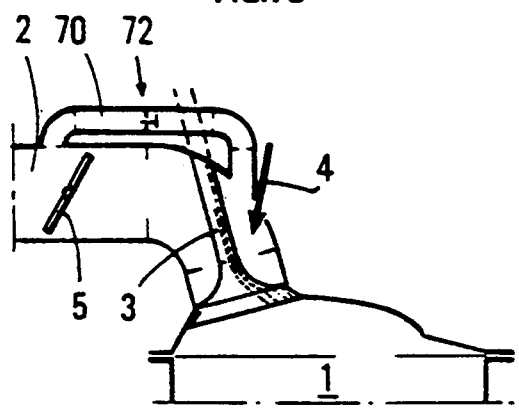
Figure 7C:
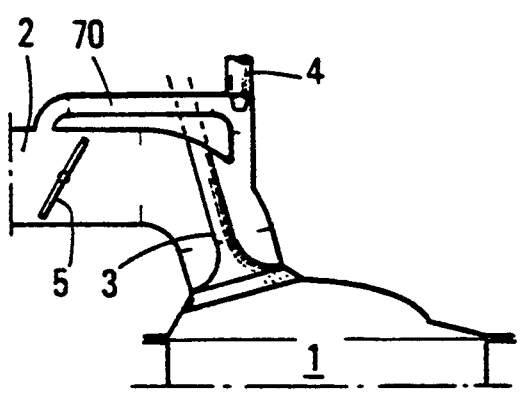

In another particular embodiment of the device according to the invention, shown in FIGS. 7A, 7B and 7C, it may be advantageous to have a small bypass line 70 of minimum flow calibration corresponding to the engine requirement. Preferably, the small line 70 includes of a bypass around the selective sealing element 5. Thus, when the selective sealing element 5 totally seals the compressed gas supply pipe 2, precise control of the minimum amount of air under pressure may be simultaneously achieved via the bypass line 70.

An adjustment screw 71 may also be possibly added for controlling this minimum flow. Of course, a check valve 72 such as that shown in FIG. 7B may also lo be placed in bypass line 70.

For each embodiment of the invention comprising a bypass line 70, the fuel metering device 4 may be advantageously placed just downstream from the by pass line 70.

According to a particular embodiment of the invention, with a device such as shown in FIG. 7C, the compressed gas flowing through the bypass line 70 may be advantageously be used for a prespraying of fuel upstream from the valve 3. In fact, certain fuel metering devices 4 are so designed that they can use the compressed gas for mixing with the fuel as soon as it leaves the injector. This is for example the case with injectors called "air mantle" injectors. These injectors are means for metering fuel continuously or sequentially, whose distinctive feature is that they may be supplied with compressed air on the periphery of the fuel injection nozzle.

Thus, according to FIG. 7C, when the selective sealing element 5, example, a butterfly valve, totally seals the compressed gas supply pipe 2, the compressed air passes through the bypass line 70 and, at the same time, carries along and sprays the fuel introduced through metering means 4, with such prespraying therefore occurring upstream from the valve 3. The mixture presprayed thereby then passes into the opening (not referenced) between the valve 3 and its seat, the acceleration which takes place therein allowing the spraying quality to be improved even more. It is of course possible to combine the device according to FIG. 7C with the means for controlling the flow of compressed air through the bypass line 70 (adjustment screw in FIG. 7A or check valve in FIG. 7B).

In the particular case where the invention is applied to a two-stroke engine with a pump crankcase, with the pump crankcase being generally used to provide the source of compressed air necessary for the pneumatic injection. In this particular case, all the devices described above remain valid, but they may be additionally combined with other means for controlling the pneumatic injection.

Figure 8:
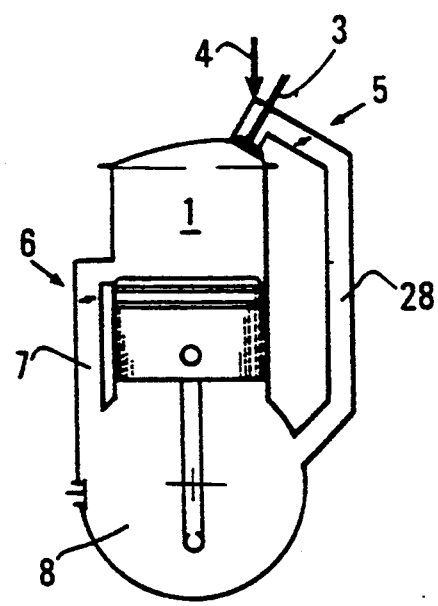
FIG. 8 is a longitudinal schematic view of an engine equipped with a device for controlling pneumatic injection according to the invention, associated with an element for gating the transfer lines.

FIG. 8 thus shows a particular case where the compressed air for the pneumatic injection comes from the pump crankcase 8 via a connecting pipe 28. It may then be very advantageous to control the flow of the transfer lines 7, as described in French patent application FR-2,649,157. The difference with respect to the prior art is that the check valve between the pump crankcase 8 and the volume of compressed air necessary for the pneumatic injection (called a capacity) may not be necessary, so that the connecting pipe 28 is not used as a storage.

In the case of the application of FIG. 8, the compressed air pressure upstream from the selective sealing element 5 depends directly on the position of this element, but it also depends on the position of the restricting element 6 located in the transfer line(s) 7. In fact, for an equal fresh gas feed to the engine, it is possible, through the combined action of the selective sealing element 5 and of the restricting element 6, to control the distribution of the flows of compressed air running through transfer lines 7 used for scavenging, and the flows of compressed air running through the pneumatic injector 4 used for the pneumatic injection. Thus, the rate of flow and the pressure conditions of the compressed air supplying pneumatic injector 4 may be optimized in accordance with the invention through a judicious positioning of the sealing element 5 and the restricting element 6.

For example, at low load, restricting element 6 will be preferably partly closed, which will have the effect of increasing the pressure level of the pump crankcase 8, of delaying its emptying in combustion chamber 1, via the transfer lines 7, and to keep it above the cylinder pressure until the opening of pneumatic injector 4. The selective sealing element 5 will also be partly closed in order to control the compressed air flow according to the invention and to obtain a pressure curve close to that of curve D in FIG. 2.

Figure 11:
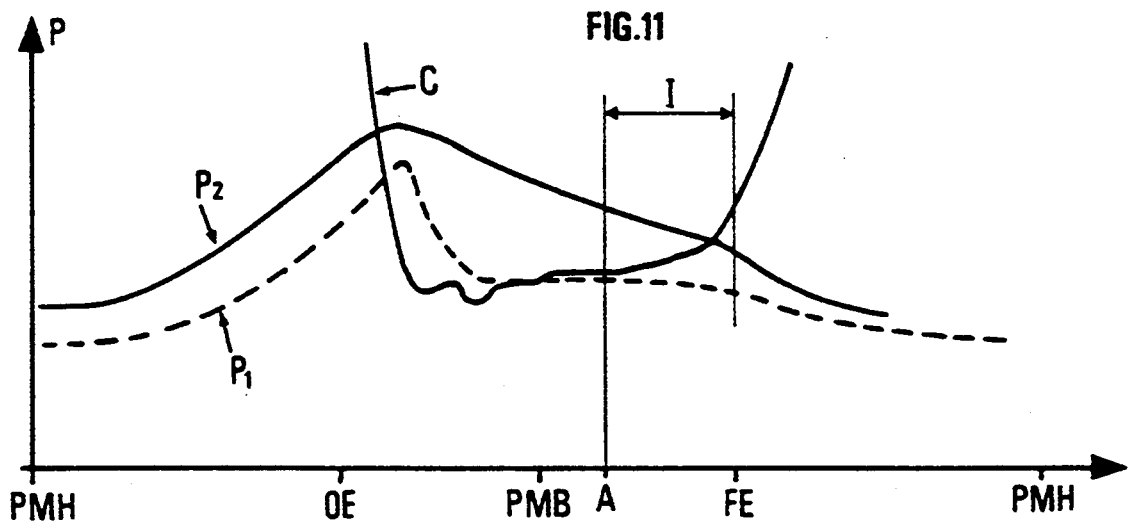
FIG. 11 is a graphical illustration of the pressure as a function of the crankshaft angle.

FIG. 11 explains this effect better. It can be seen that, with the restricting element 6 closed, the pressure P2 in the pump crankcase has been raised permanently with respect to a pressure P1 obtained without the sealing transfer line(s) 7. Thus, the pressure P2 of the pump crankcase, which is also the pressure prevailing in the connecting pipe 28 upstream from element 5, remains higher than the cylinder pressure C until an advanced moment of the pneumatic injection. Pressure P2 may thus be used for the pneumatic injection and the compressed air flow therefore has to be controlled by a device according to the invention so as to obtain a fuel jet properly sprayed with a slower penetration for low engine loads.

Figure 9:
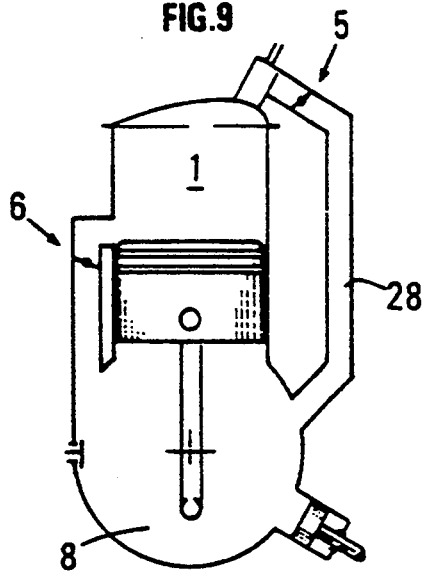
FIG. 9 is a schematic view of an engine similar to that of FIG. 89 in which the volume of the pump crankcase is variable.

As shown in FIG. 9, for example, the volume of pump crankcase 8 may vary according to the load conditions of the engine, so as to vary the compression level of the pump crankcase, which may be another way to embody the purpose of the element. The pressure level upstream from the selective sealing element 5 according to the invention may thus be controlled via the control of the volume of pump crankcase 8 and therefore of its compression ratio. To that effect, a sliding element of the piston type (not shown) located in a volume communicating with pump crankcase 8 may be provided.

Figure 10:
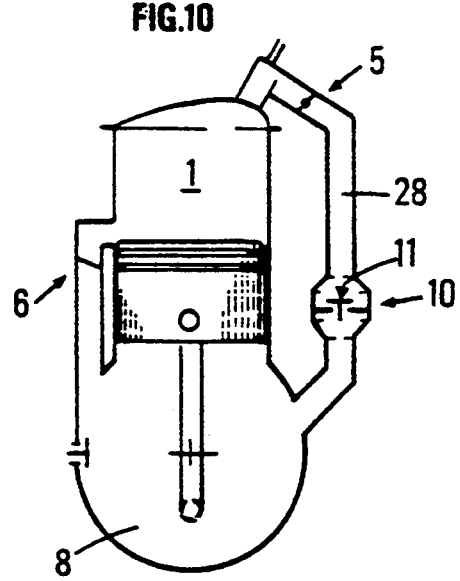
FIG. 10 is a schematic view of an engine equipped with a device for controlling the pneumatic injection according to the invention, in which the supply pipe forms a capacity for storing gas under pressure.

According to another possible utilization of the device in accordance with the invention, illustrated by FIG. 10, the volume variation of the pump crankcase may also be combined with a volume variation of the compressed air line or capacity upstream from selective sealing element 5. To that effect, a part 10 of the piston type may possibly be placed in the connecting pipe 28, mobile about the axis of the connecting pipe 28 and dividing the connecting pipe 28 into two parts, one communicating directly with pump crankcase 8 and the other part forming a pressure storage. A check valve 11 located, for example, on piston 10 may then contribute to forming the storage capacity.

Figure 12:
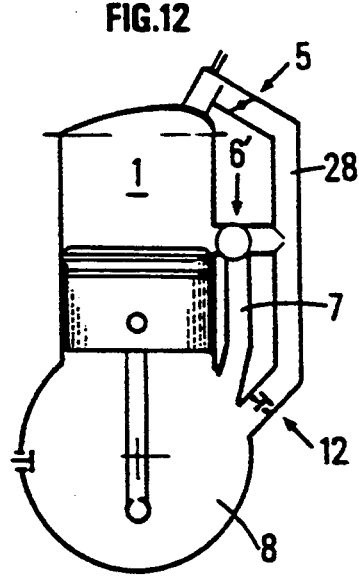
FIG. 12 is a schematic view of an engine equipped with a device for controlling the pneumatic injection according to the invention, associated with a capacity for storing gas under pressure.
Figure 12A:
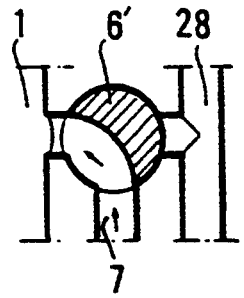
FIGS. 12A and 12B are schematic partial cross-sectional views of details of the embodiment of the engine according to FIG. 12.
Figure 12B:
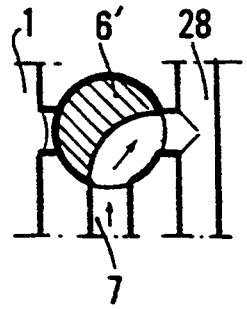

FIGS. 12, 12A and 12B illustrate another manner for obtaining a volume variation of the pump crankcase 8 by a restricting element 6' placed at the junction of a transfer line 7 and of pipe 28. FIGS. 12, 12A and 12B show, in fact, an example where a rotating element 6' is used as a restricting element both for transfer lines 7 and for pipe 28.

For example, when the transfer lines 7 are not sealed (which corresponds to high engine load conditions and to FIG. 12A), the volume of pump crankcase 8 is at its minimum level and the pipe 28 forming a capacity only communicates with pump crankcase 8 through a check valve 12 conventionally placed on the connecting pipe 28. Thus, a pump crankcase 8 of minimum volume will allow maximum compression of the compressed air stored in in the connecting pipe 28, which will be useful for injecting pneumatically large amounts of fuel (at high loads).

On the other hand, when the load decreases, restricting element 6 rotates so as to partly seal the transfer lines 7 while directly communicating the transfer line 7 with the connecting pipe 28. FIG. 12B illustrates this operating mode. Check valve 12 is no longer useful and the connecting pipe 28 is then part of the volume of pump crankcase 8 via the transfer line 7. The volume of pump crankcase 8 is significantly increased thereby.

This arrangement allows the pressure level of the compressed air flow supplying the pneumatic injector upstream from the selective sealing element 5 to be decreased.

The nonreturn element 12 may be, as noted above, a conventional check valve. It may also consist of an assembly such as shown in FIGS. 5A and 5B, an assembly capable of combining a closed position (FIG. 5A), where the check valves fulfil a nonreturn function, with an open position (FIG. 5B), where the check valves no longer control the opening of the connecting pipe 28.

Figure 1:
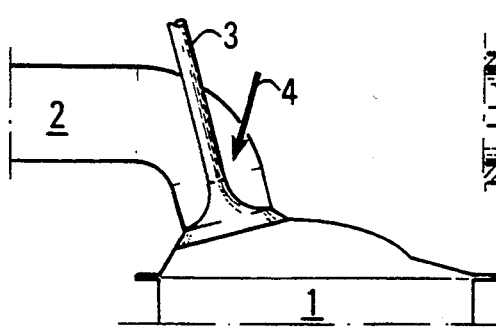
FIG. 1 is a schematic view of a conventional pneumatic injection system for a two stroke engine.
Figure 13:
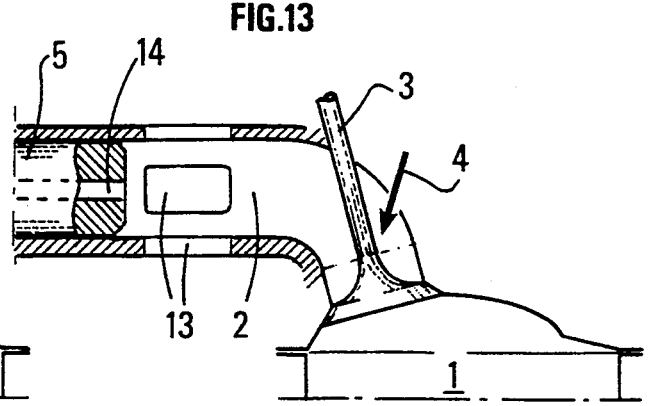
FIG. 13 is a schematic partial cross-sectional view of another embodiment of the invention.

Finally, FIG. 13 illustrates an embodiment of the invention where the selective sealing element 5 has the form of a piston sliding in pipe 2 and which may or may not seal one or several ports 13 of compressed gas supply pipe 2. Thus, the air under pressure necessary for the pneumatic injection may be introduced through the ports 13 in the compressed gas supply pipe 2 when the sealing element 5 is in the position shown in FIG. 13.

A longitudinal channel 14 is also provided in the piston 5. This channel allows, when the piston 5 seals the ports 13, a low flow of compressed air to be passed.

A linkage or any other means known in the art will allow displacement of piston 5, as a function of the operating conditions of the engine.

At low loads, the piston will preferably cover the main inlet ports 13 delivering air under pressure, so that only a small amount of air will be admitted. In this position, the volume contained between piston 5 and valve 3 is reduced, which considerably improves the pneumatic injection. This is a particularly advantageous feature of this embodiment of the invention.

The device according to the invention, such as described above, is preferably used for self-ignition two-stroke engines, i.e. engines requiring no controlled ignition of the charge under low load conditions.

In fact, according to the invention, the flow rates through the pneumatic injector and the transfer lines are regulated so as to obtain this self-ignition running.

Of course, other modifications and/or additions may be provided by the man skilled in the art to the device described above without departing from the scope of the present invention.

We claim:

1. A device for controlling pneumatic injection of a carburetted mixture in a combustion chamber of a cylinder of a two-stroke internal combustion engine, the device comprising a compressed gas supply pipe adapted to be communicated with the combustion chamber of the cylinder by an intermittent sealing element, and a fuel injection device opening into said compressed gas supply pipe, a selective sealing element arranged in said compressed gas supply pipe upstream from said intermittent sealing element and from said fuel injection device adapted to control all of the carburetted mixture in said compressed gas supply pipe and used for the pneumatic injection directly into said combustion chamber as a function of sensed operating conditions of said engine so as to achieve a constant and continuous spraying of said carburetted mixture during the pneumatic injection directly into said combustion chamber.

2. A control device as claimed in claim 1, wherein the compressed gas is supplied from a pump crankcase of the cylinder.

3. A device as claimed in one of claims 1 or 2, wherein said intermittent sealing element includes a rotary plug.

4. A device as claimed in one of claims 1 or 2, wherein said selective sealing element includes a butterfly valve.

5. A device as claimed in one of claims 1 or 2, wherein said selective sealing element includes a rotary plug.

6. A device as claimed in one of claims 1 or 2, wherein the selective sealing element includes a piston sliding in the compressed gas supply pipe which is adapted to seal at least one port of the compressed gas supply pipe for the inlet of compressed air, and wherein said piston includes a longitudinally extending channel for enabling a slow flow of air to be communicated with the combustion chamber.

7. A device as claimed in one of claims 1 or 2, wherein said selective sealing element includes an assembly comprising at least one dog associated with at least one leaf spring, said assembly forming a nonreturn valve.

8. A device as claimed in one of claims 1 or 2, wherein said selective sealing element includes an element forming a restriction in a section of said compressed gas supply pipe over a variable length in dependence upon the operating conditions of the engine.

9. A device as claimed in one of claims 1 or 2, further comprising a bypass line for bypassing said compressed gas supply pipe, said bypass line, of a smaller diameter than said compressed gas supply pipe being located on either side of said selective sealing element and allowing a minimum amount of air necessary for the pneumatic injection to be conveyed under a high pressure.

10. A device as claimed in claim 11, wherein said bypass line includes an element for restricting a flow rate of said bypass line.

11. A device as claimed in claim 9, wherein said fuel metering device opens into a portion of said bypass line which is at the shortest distance from said intermittent sealing element.

12. A device as claimed in one of claims 1 or 2, wherein at least one transfer channel for injecting scavenging air supplied from a pump crankcase into said cylinder includes an element for restricting a flow rate of the scavenging air so as to enable a modulation between the flow of air injected for scavenging via said transfer channel and the flow of air for the pneumatic injection of fuel may be achieved.

13. A device as claimed in claim 2, further comprising an element for allowing a volume of said pump crankcase to be varied.

14. Use of the device as claimed in one of claims 1 or 2 in a two-stroke engine in combination with transfer lines adapted to be sealed as a function of the sensed running conditions of the engine.

15. Use of the controlling device as claimed in one of claims 1 or 2 in a self-ignition two-stroke engine.

16. A control device as claimed in claim 1, wherein the compressed gas is supplied from a compression means disposed outside the cylinder.

17. A device as claimed in one of claims 1, 2 or 16 wherein said intermittent sealing element includes a valve.

* * * * *